Nov. 8, 1932.   G. RAUBERSTRAUCH   1,887,168
METHOD FOR MAKING BUSHING LINERS
Filed Aug. 29, 1930

GEORGE RAUBERSTRAUCH
INVENTOR

BY John E. Reufer
ATTORNEY

Patented Nov. 8, 1932

1,887,168

UNITED STATES PATENT OFFICE

GEORGE RAUBERSTRAUCH, OF CLEVELAND, OHIO, ASSIGNOR TO THE CLEVELAND ROCK DRILL COMPANY, OF CLEVELAND, OHIO, A CORPORATION OF OHIO

METHOD FOR MAKING BUSHING LINERS

Application filed August 29, 1930. Serial No. 478,653.

This invention relates broadly to bushings and is more particularly concerned with a method of making the same.

It has heretofore been the practice in the manufacture of bushings of the type provided with wear liners, to "press" the liner within the outer shell and rely upon such securement to retain the liner therein. Bushings so assembled have proven satisfactory in some instances, but when the bushings thus assembled have been subjected to excessive reciprocative strain, as for example in a fluid actuated machine of the hammer type, the liners soon become loosened in the shells, thereby rendering the bushings unserviceable in a comparatively short length of time.

Liners for bushings of this character are preferably composed of relatively hard bearing metal such as bronze, or similar relatively hard alloys and when attempts have been made to expand the end portions of such liners within the shells the results have been unsatisfactory, as they invariably crack or split during the expanding operation, thus resulting in a high percentage of loss.

By the employment of the method of the present invention the objectionable features of former methods have been eliminated and it is possible to employ a better and more suitable alloy for the wear pins or liner.

It is also within the purview of the present invention to produce a bushing of the class referred to in a more expeditious efficient manner.

Other objects and advantages of the present invention will appear more fully hereinafter as the description thereof proceeds.

Referring to the drawing wherein like reference characters represent like parts throughout the several views, Fig. 1 is a view showing a bushing mounted in the chuck of a lathe and a tool in position ready to expand the liner of the bushing within the shell, the bushing being shown in cross section;

Figure 3:
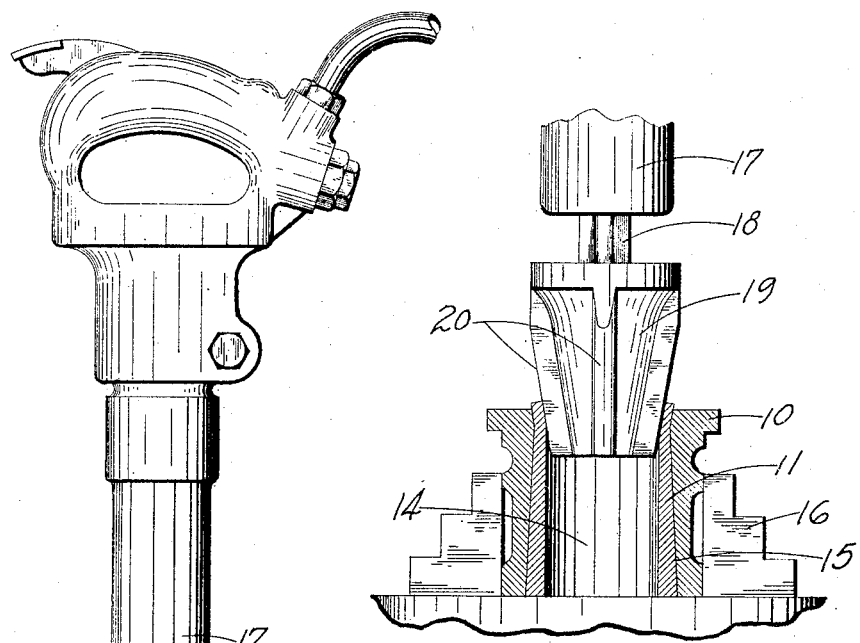
Fig. 3 is a view similar to Fig. 2 but showing the bushing after the expanding operation has been completed.
Figure 2:
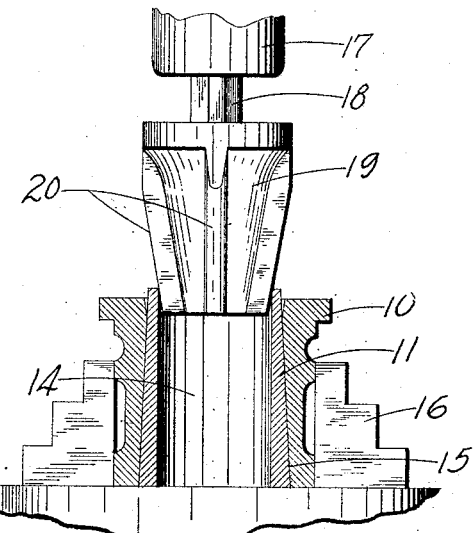
Fig. 2 is a view showing certain parts of Fig. 1 on an enlarged scale.

According to the present invention the bushing comprises an outer shell 10 and a liner 11 preferably of relatively hard bearing metal. The outer shell is provided with a tapered bore 12 the smaller end of which is beveled or flared outwardly, as at 13. The liner is provided with a cylinderical bore 14 and an outer tapered surface 15, the taper of which is complementary to the taper of the bore of the shell. The liner and shell are assembled by securing the former within the latter in the manner known in practice as a "press fit". Obviously this structure affords a recess circumambient the flared mouth 13 of the bushing into which the metal of the end of the liner may be distortively driven. The bushing as thus assembled is then mounted in the chuck 16 of a lathe in a manner shown in Fig. 1.

The machine employed for expanding the end of the liner within the shell is a portable fluid actuated machine 17 of the hammer type. Mounted upon the shank 18 of the machine there is a swaging tool which is formed with a tapered end portion 19. The periphery of the head is provided with a plurality of ribs 20 which are of a suitable configuration to preclude cutting or marring of the liner.

Figure 1:
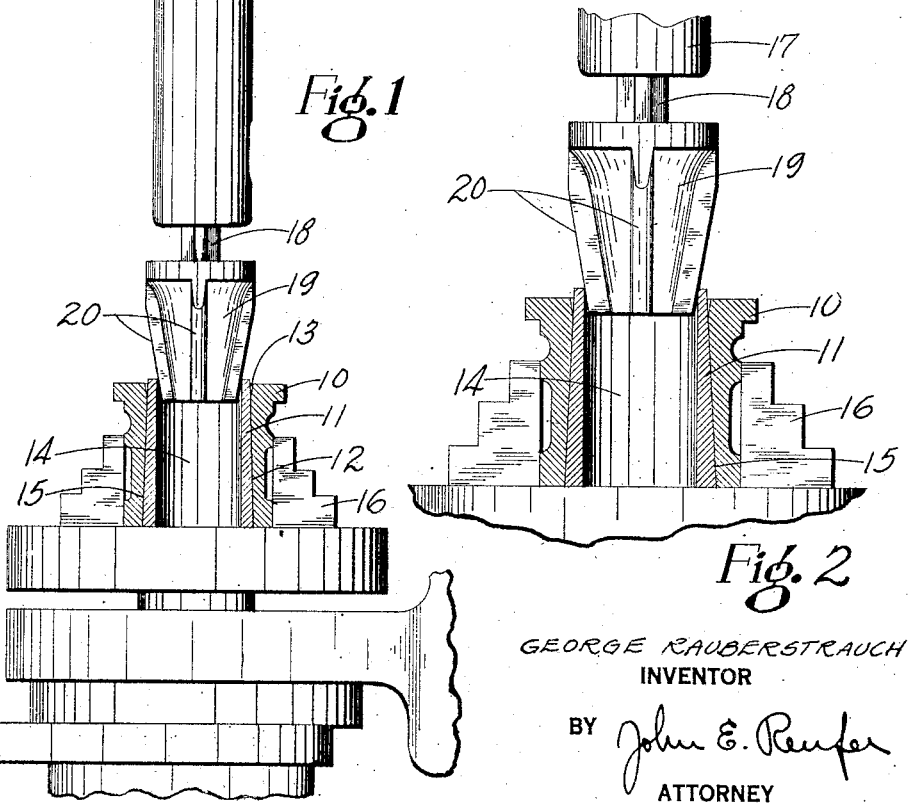

After the bushing is mounted in the chuck, the spindle of the lathe is rotated at a relatively high speed, preferably around two thousand revolutions per minute. The machine 17 is then held adjacent the work as indicated in Fig. 1 with the end of the tool 19 inserted within the bore in the liner and the machine is then set in operation in the usual manner. The operator controls the machine to effect light intermittent blows to be delivered by the expanding tool against the mouth of the liner, as the crest only of the ribs 20 engages the inner surface of the liner, the blows are received simultaneously therein at a plurality of spaced points. Since these blows are delivered to the liner while the latter is rotating at a relatively high speed, the operation is in effect a uniform multiple peening or ironing out of the liner about the inner surface thereof to conform the same to the flared mouth of the shell. By this method the liner is quickly expanded within the shell and without the danger of cracking or splitting the same during the assembly operation, and the liner will be securely retained therein due to the divergency of the bores in the shell, as shown in Fig. 3.

After the liner is expanded machine and tool 19 is withdrawn and the assembled bushing is then in condition for reaming or finishing the bore.

In a bushing constructed in accordance with the foregoing it will be apparent that the possibility of the liner becoming loose within its shell, due to any reciprocative strain to which it may be subjected, will be entirely obviated. Also that such bushings can be quickly and economically manufactured without danger of fracture during the expanding operation.

Although the foregoing is necessarily detailed in character in order to completely set forth the invention it is to be understood that the specific terminology is not intended to be restrictive or confining and it is to be further understood that modifications and variations may be resorted to without departing from the scope or spirit of the invention as defined by the subjoined claims.

What I claim and desire to secure by Letters Patent is:

1. The method of making bushings which comprises disposing a liner having a tapered outer surface within a tubular shell having a bore with a taper corresponding to the taper of said shell, said bore being flared near its smaller end, and expanding the adjacent end of said liner to conform to the flare in the shell.

2. The method of making bushings which comprises disposing a liner having a tapered outer surface within a tubular shell having a bore with a taper corresponding to the taper of said shell, said bore being flared near its smaller end, and expanding the adjacent end of said liner to conform to the flare in the shell by delivering a series of light intermittent blows around the inner surface of said liner.

3. The method of making bushings which comprises pressing a liner having a tapered outer surface tightly within a tubular shell having a bore with a taper corresponding to the taper of said shell, said bore being flared near its smaller end, expanding the adjacent end of said liner to conform to the flare in the shell by simultaneously delivering intermittent blows at a plurality of spaced points around the inner surface of said liner by means of a tapered tool having blow delivering lips disposed around its periphery and maintaining relative rotational movement between the bushing and tool during the expanding operation.

4. The method of making bushings which comprises pressing a liner having a tapered outer surface tightly within a tubular shell having a bore with a taper corresponding to the taper of said liner, said bore being flared near its smaller end, mounting the assembled bushing in the chuck of a lathe with the flared end outermost, rotating the spindle of the lathe to cause rotary motion of the bushing and expanding the outer end of the liner to conform to the flare in the shell by simultaneously delivering intermittent blows at a plurality of spaced points around the inner surface of said liner during the rotation of said bushing by means of a portable tapered hand tool having a plurality of blow delivering lips disposed around its periphery.

5. The method of making bushings which comprises pressing a liner of hard alloy having a tapered outer surface tightly within a tubular shell having a bore with a taper corresponding to the taper of said shell, said bore being flared near its smaller end, expanding the adjacent end of said liner to conform to the flare in the shell by simultaneously delivering light intermittent blows at a plurality of spaced points around the inner surface of said liner, by means of a tapered tool having blow delivering lips disposed around its periphery and maintaining relative rotational movement between the bushing and tool during the expanding operation.

In testimony whereof I hereunto affix my signature this 23 day of August, 1930.

GEORGE RAUBERSTRAUCH.